April 16, 1968     F. HADINEC     3,378,038

CONTROL SYSTEM FOR A DOBBY MACHINE

Filed April 6, 1966     6 Sheets-Sheet 1

INVENTOR.
Frantisek Hadinec
by Michael J. Striker

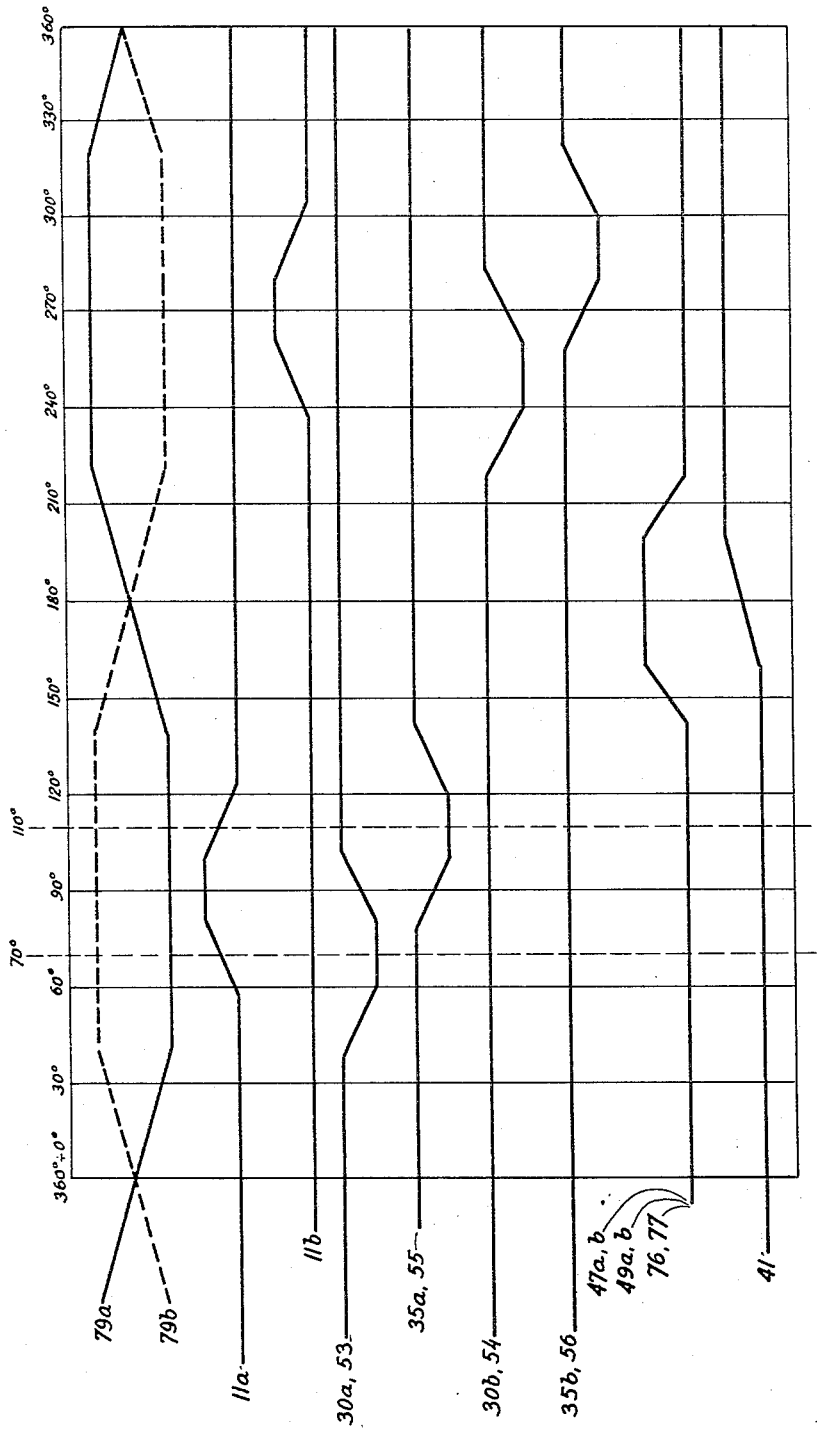

United States Patent Office 3,378,038
Patented Apr. 16, 1968

3,378,038
CONTROL SYSTEM FOR A DOBBY MACHINE
Frantisek Hadinec, Lomnice nad Popelkou, Czechoslovakia, assignor to Elitex, Zavody Textilniho Strojirenstvi, Liberec, Czechoslovakia
Filed Apr. 6, 1966, Ser. No. 540,665
Claims priority, application Czechoslovakia, Apr. 6, 1965, 2,243/65
14 Claims. (Cl. 139—66)

ABSTRACT OF THE DISCLOSURE

A dobby machine is controlled by program means having recordings representing weft insertions and sensed by sensing means controlling movements of operating means which operate blocking means of spring biased actuating means having operative positions for coupling the output means of the dobby machine with drive means. A main shaft controls the actuating means to move cyclically to the operative position when released by the blocking means so that the dobby machine can be reversed and returned to any desired position without disturbing the sequence of weft insertions.

---

The present invention relates to a control system for a high speed dobby machine, and more particularly to an improved control system for a double acting dobby machine of the Hattersley type.

A control system serving the same purpose is disclosed, for example, in the British Patent No. 906,983.

It is one object of the invention to provide a control system for dobby machines which permit the return of the dobby machine to any desired position without any disturbance in the sequence of the weft threads.

Another object of the invention is to provide an improved control system for dobby machines, which is particularly suited for the high speed double-action dobby machines of the Hattersley type.

In dobby machines of the Hattersley type, the drawhooks are pressed apart by a pressure roller revolving with a rotary main shaft under the control of a program carrier type, such as a verdol card.

If on a loom provided with a motor driven weft thread selector and with a control system acoording to the prior art, it is necessary to turn back the dobby machine, for example due to breakage of the weft thread, or malfunction of the shuttle, or of the shuttle inserting device, it is necessary to turn the main shaft of the control system at least one complete revolution in order to obtain the exact correct sequence of weft thread during the following weaving operation, and only after turning the machine one revolution, the weaving operation can be continued. The turning back for one revolution of the main shaft of the dobby machine according to the prior art is necessary since in the event that the machine has been turned back beyond the position of rest of the control system, a stop means of the control system has to be turned for applying an impulse to the motion of the loom shaft, so that this displaced position could not be eliminated during the same revolution of the main shaft which precludes the possibility of obtaining return of the stop means to its initial position corresponding to a position of rest of the loom shaft.

Only further turning of the main shaft of the dobby machine in the reversed direction of rotation, assures the correct sequence of weft threads before the following revolution of the shaft of the dobby machine in forward direction. This means, that in the event that, for example, the fifth last weft thread is to be found, the main shaft of the dobby machine has to be turned back seven weft threads, whereupon the main shaft has to be turned forward for two weft threads in order to obtain complete agreement of the position of the dobby machine with the sequence of the weaving pattern of the fabric made on the loom; only then it becomes possible to continue the weaving. These corrective operations cause time losses which are extremely undesirable.

Dobby machines have been proposed which are capable of operating in both directions of rotation. These machines apply the principles of a Jacquard machine, but since the drawhooks are coupled with the driving knives only due to the action of the force of gravity, the solution of the prior art cannot be applied to high speed dobby machines, operating at speeds of over 200 revolutions per minute.

It is consequently another object of the present invention to provide a control system for high speed dobby machines in which operations are carried out under the action of springs.

The present invention is preferably appiled to a high speed double-acting dobby machine of the Hattersley type, whose drawhooks are held disengaged from the driving knives by pressure members controlled by an arm of a rotary main shaft and by blocking means which are operated under the control of a program tape, such as a verdol card. In accordance with the present invention, a double control system is provided which makes it possible that in one direction of rotation, a first group of control means acts on the blocking means when sensing a first weft thread, and immediately erases the corresponding impulse, while a second group of control means acts on the blocking means to supply to the same an impulse representing a second subsequent weft thread, the impulse being derived from the program tape. The impulse representing the new weft thread remains active and stored until the loom shaft has been displaced so that in the event of a reversal of the rotary movement of the dobby shaft, the functions of the two groups of control means can be exchanged at any moment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
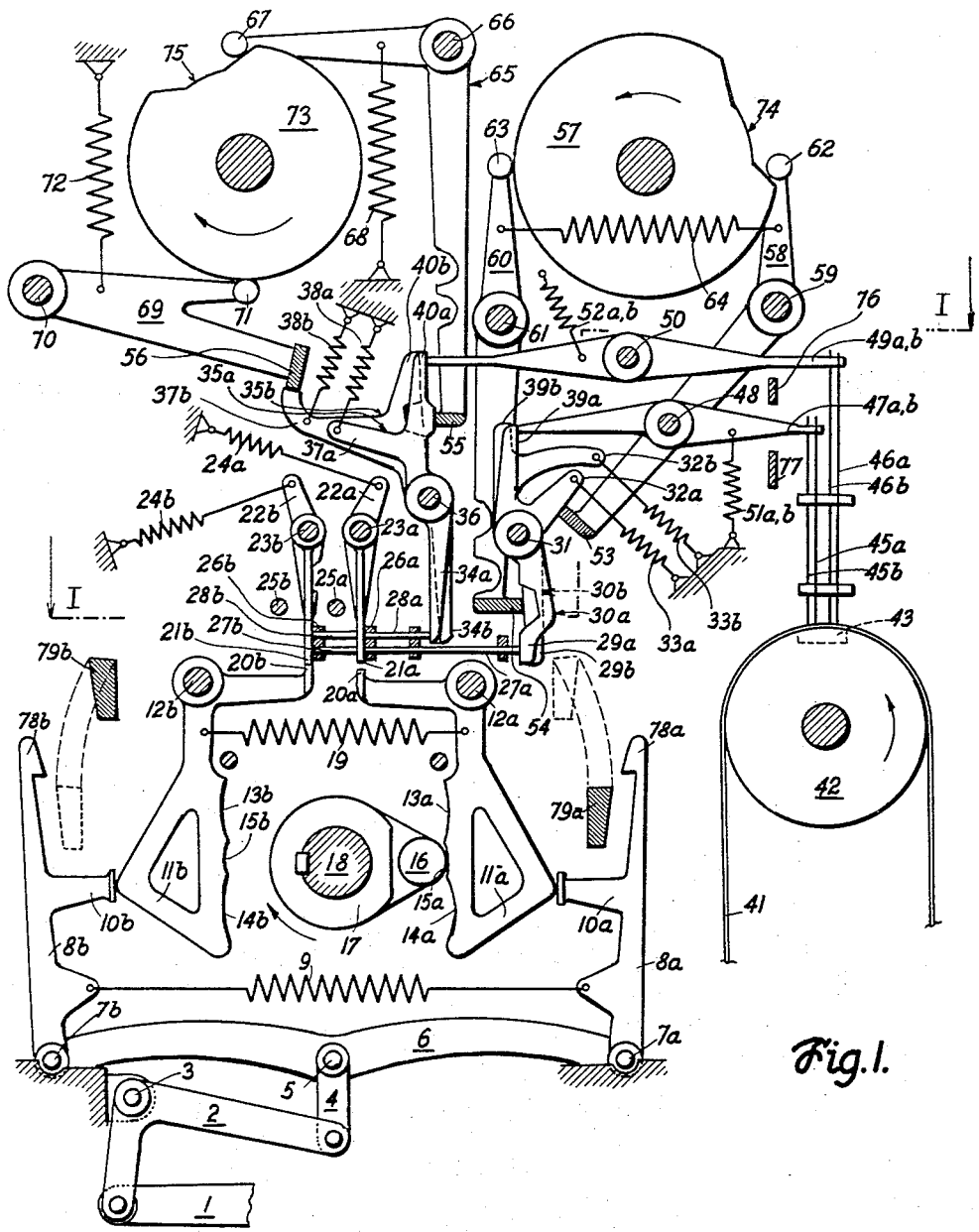
FIG. 1 is a schematic side elevation of a control system, illustrating the system in a position corresponding to the change from an old weft thread to a new weft thread.
Figure 5:
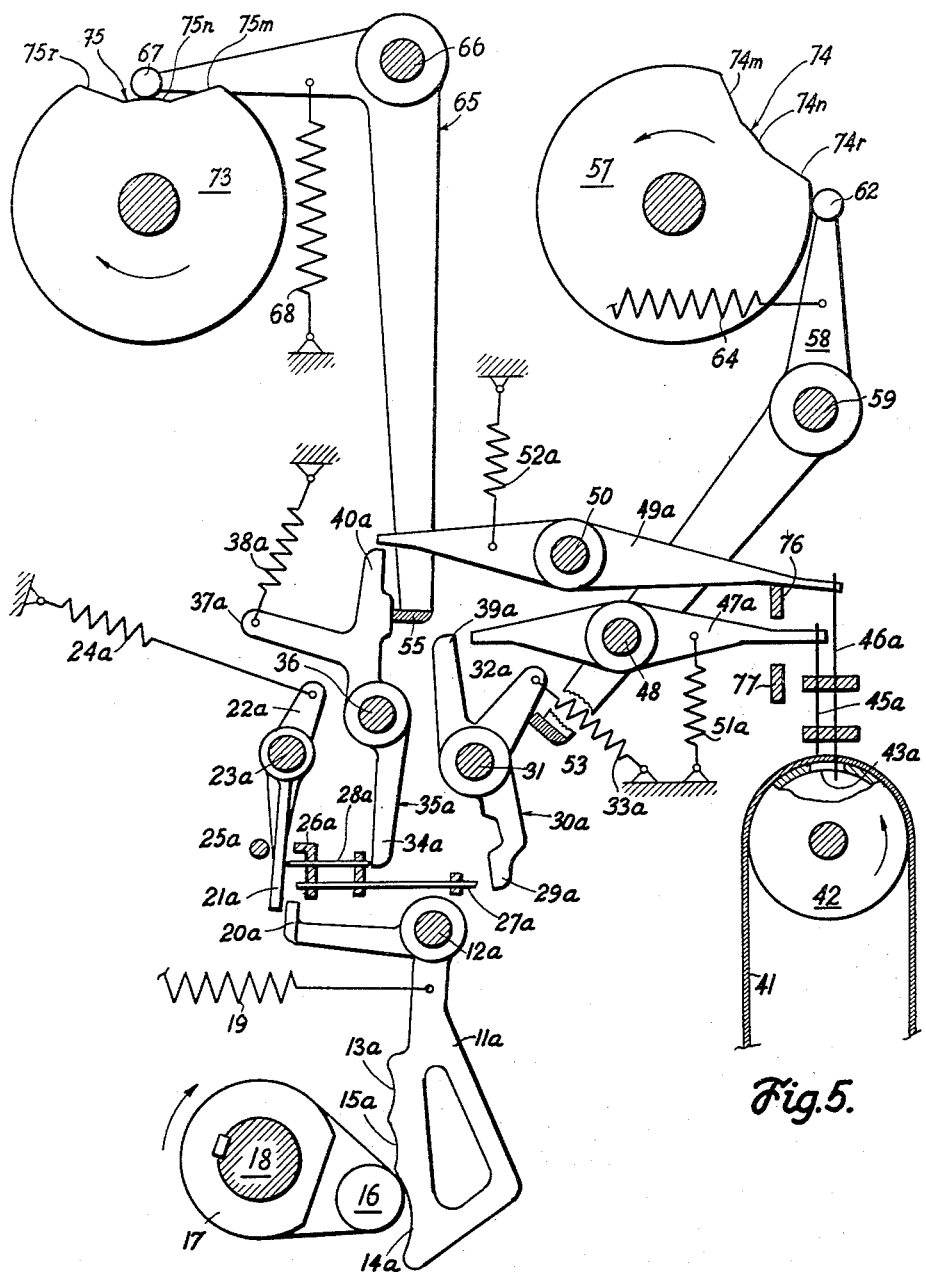

FIG. 5 is a fragmentary side elevation, partially in section, illustrating the right half of the control system of FIG. 1 in a position directly following the change from an old weft thread to a new weft thread in the event that an impulse representing a new weft thread is already stored in the control system, and during the movement of the main shaft of the dobby machine in the working direction; and FIG. 6 is a diagram schematically illustrating the positions of parts of the control system during one revolution of the main shaft of the dobby machine.

The control system of the present invention is applied to a double-lift dobby machine, and constitutes an improvement of the control system disclosed in the British Patent No. 906,983, the Czechoslovakian Patent No. 94,664, the Austrian Patent No. 219,515, the Swiss Patent No. 370,026, the French Patent No. 1,272,482, and the Italian Patent No. 613,616.

Referring now to the drawings, and more particularly to FIG. 1, a pull rod 1 is pivotally connected with an angular lever 2 mounted on a pivot 3 and articulated with a link 4 which is connected by a joint 5 to a balancing lever 6 at whose ends drawhooks 8a and 8b are mounted by means of pivots 7a and 7b. A spring 9 connects drawhooks 8a and 8b and urges the same to move toward each other out of the inoperative positions shown in FIG. 1, and to positions in which the hooks 78a and 78b are respectively located in the paths of movement of a pair of knives 79a, 79b, so that one or the other of the knives displaces the respective hook and thereby one end of lever 6. Knives 79a, 79b constitute drive means by which the output means 1 to 6 are operated when either coupling means 8a, 78a, or coupling means 8b, 78b is in a coupling position coupled with drive means 79a, 79b, respectively, for movement therewith, while the respective other coupling means is disengaged.

The drawhooks 8a, 8b have transversely projecting arms 10a, 10b respectively abutting two press members 11a and 11b which are mounted for three turning movements on shafts 12a, 12b and are shown to be double-armed angular levers whose lower arms are substantially triangular. The apices of the triangular lever arms are engaged by arms 10a and 10b under the action of spring 9. The confronting edges of press members 11a, 11b are formed with three recesses 13a, 15a, 14a, and 13b, 15b, 14b, respectively.

A main shaft 18 carries a pair of arms 17 between which a cylindrical roller 16 is mounted for rotation so that during rotation of shaft 18 about its axis in the direction of the arrow S, roller 16 will successively engage recesses 13a, 15a, 14a, 14b, 15b, and 13b. Only one pair of drawhooks, and one pair of press members are shown, but it will be understood that roller 16 and knives 79a, 79b cooperate with more than one row of press members and drawhooks.

Figure 4:
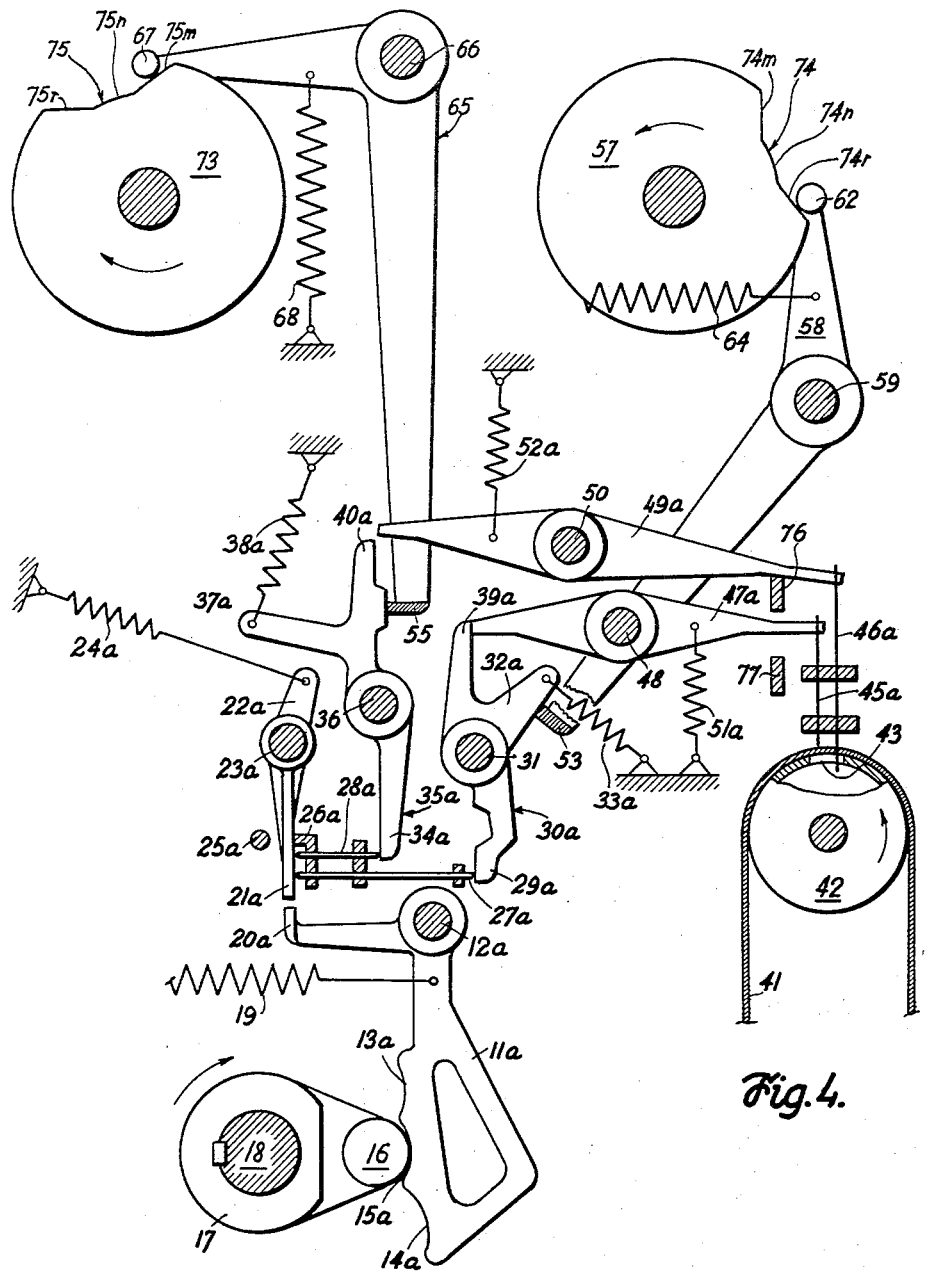
FIG. 4 is a fragmentary side elevation, partially in section, illustrating the right half of the control system of FIG. 1 in another operational position in which the old weft thread is being exchanged for the new weft thread during the turning movement of the main shaft of the dobby machine in the working direction.

In the position of main shaft 18 illustrated in FIG. 1 and FIG. 4, roller 16 is engaged by the recess 15a. Main shaft 18 rotates at half the number of revolutions of the loom crank shaft. A spring 19 connects press members 11a and 11b and urges the same to turn toward roller 16 to a position in which the recesses in the press members are located in the path of movement of roller 16.

The upper arms of press members 11a, 11b have engaging portions 20a, 20b cooperating with projections 21a, 21b on a pair of blocking members 22a, 22b shown to be double-armed angular levers mounted for turning movements on a pair of shafts 23a, 23b and having arms to which a pair of springs 24a, 24b is connected for turning both blocking members 22a, 22b in counterclockwise direction. A pair of perforated stop members 26a, 26b limits such movement, whereas abutments 25a, and 25b limit turning movement of blocking levers 22a, 22b in clockwise direction.

First and second motion transmitting rods or "needles" 27a, 28a, are guided in bores of stop members 26a and on corresponding guide members and cooperate with the blocking portion 21a of blocking member 22a under the control of portions 29a, 34a of first and second trip members 30a, 35a which are mounted for turning movement on shafts 31, 36 and have arms 39a, 37a on which springs 33a, 38a act to turn trip members 30a and 35a in clockwise direction so that the forces transmitted through needles 27a, 28a act on the respective blocking member 22a to turn the same in clockwise direction out of the path of movement of portion 20a of press member 11a. This construction is best seen in the enlarged views of FIGS. 3 to 5 which illustrate only half of the control system.

As shown in FIG. 1, a trip member 30b is mounted on shaft 31, and a trip member 37b is mounted on shaft 36. Trip members 30b and 37b have free arms engaged by springs 33b and 38b which bias trip members 30b and 37b to turn in clockwise direction. The lower portions 29b and 35b of trip members 30b and 35b engage the ends of a pair of longer motion transmitting needles 27b, 28b whose other ends cooperate with blocking portion 21b of blocking member 22b. The arrangement of the motion transmitting needles, blocking members and trip members is best seen in the left portion of the plan view of FIG. 2.

The pairs of first and second trip members 30a, 30b, 35a, 35b are controlled by pairs of first and second sensing means which sense information regarding a desired weaving pattern recorded on a program carrier. In the illustrated embodiment, a so-called "verdol card," or other perforated tape is moved over a stationary drum 42 in the direction of the arrow of FIG. 1.

Figure 2:
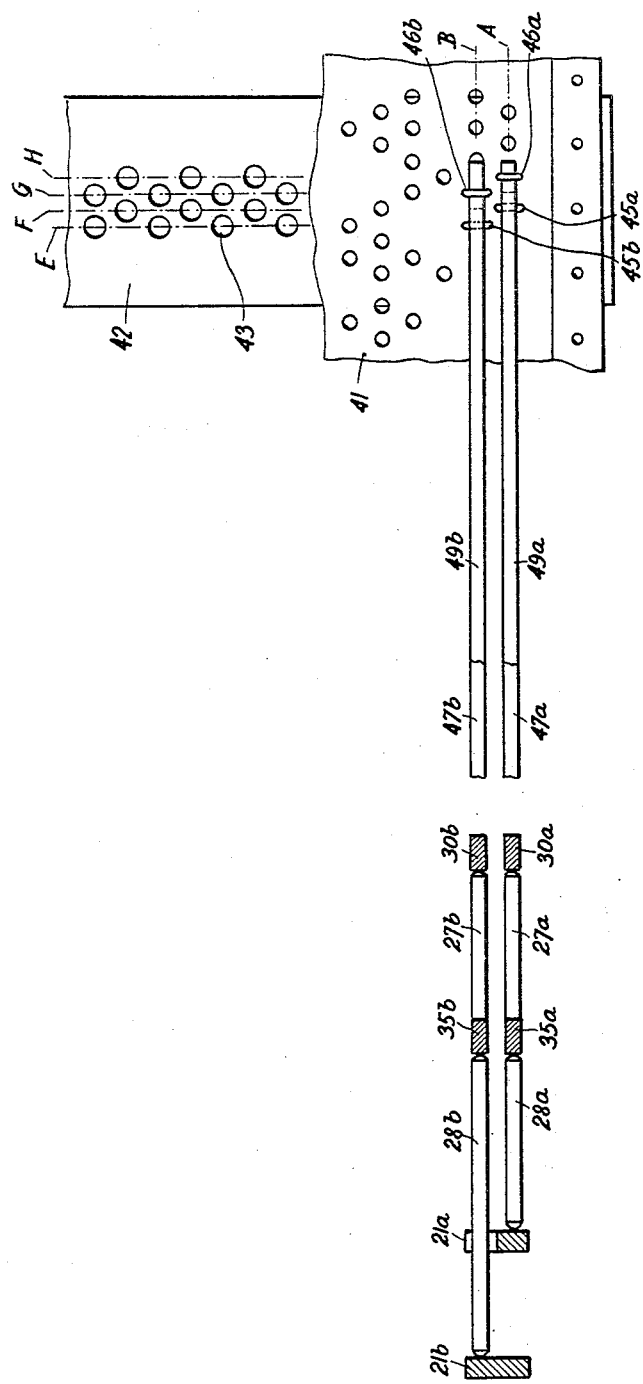
FIG. 2 is a fragmentary plan view on an enlarged scale, illustrating parts of the control system of FIG. 1, partially in section along line I—I in FIG. 1.

As best seen in FIG. 2, drum 42 has four rows E, F, G, H of staggered perforations 43. The distances between the rows of perforations or holes in drum 42, corresponds to the distances between perforations in the program tape or verdol card 41. Perforations 44 are arranged in rows extending in the direction of movement of the program tape 41 and spaced in order to represent a desired weaving pattern. The two rows A and B of perforations 44 are used for controlling the position of the held shafts of the loom by means of the control system illustrated in FIG. 1. The row A controls drawhook 8a, and the row B controls drawhook 8b which influence the movement of the held shafts.

Two first sensing means are provided which include two feeler levers 47a, 47b both mounted on a shaft 48 and carrying feeler needles 45a, 45b, respectively sensing leading perforations in rows A and B. Springs 51a, 51b act on feeler levers 47a, 47b to turn the same in clockwise direction so that the feeler needles 45a, 45b are urged against the program tape 41 and will pass through perforations 44 into openings 43 in drum 42, if during movement of the program tape 41 perforations are placed under feeler needles 45a, 45b. If this happens, and the respective sensing lever 47a, 47b turns in clockwise direction, the corresponding trip member 30a or 30b is released for turning movement under the action of the respective spring 33a or 33b.

Two second sensing means include two feeler levers 49a, 49b urged by springs 52a, 52b to turn in clockwise direction, and feeler needles 46a, 46b respectively secured to feeler levers 49a, 49b and cooperating with the perforated program tape in the manner described with reference to feeler needles 45a, 45b, as best seen in FIG. 2. When one of the feeler needles 46a or 46b enters through a perforation in the program tape into a hole 43 of drum 42, the respective second feeler lever 49a, or 49b is turned in clockwise direction and releases the arm portion 40a or 40b of the respective trip member 35a or 35b for movement in clockwise direction under the action of springs 38a, 38b.

Feeler needles 45a and 46a are associated with press member 11a and drawhook 8a, and feeler needles 45b, 46b are associated with press member 11b and drawhook 8b. The operations of drawhooks 8a, 8b are therefore respectively controlled by rows A and B of perforations 44.

Springs 51a, 51b, 52a, and 52b bias the sensing means so that the feeler needles 54a, 54b, 46a, 46b enter through a perforation in tape 41 into a hole 43 when any feeler needle registers with an opening 44, permitting a turning movement of the respective feeler lever about shaft 48 or 50.

The rows of trip levers 30a and 30b are respectively controlled by bars 53 and 54, and the trip levers 35a and 35b are respectively controlled by bars 55 and 56. Bar 53 cooperates with arm 32a of trip lever 30a, while bar 54 acts on the lower end of arm 29b of trip lever 30b. Bar 55 acts on the upper end of arm 40a of trip lever 35a, and bar 56 acts on the arm 37b of trip lever 35b.

Bars 53 and 54 are controlled by a rotary cam 57, and bars 55 and 56 are controlled by a rotary cam 73. Cams 57 and 73 are mounted on a pair of parallel shafts and rotate in opposite direction, but it would be possible to mount both cams on the same shaft and to have them rotate in the same direction. Cams 57 and 73 are of the same size, but in order to save space, cam 73 is shown to have a smaller diameter. Cam 57 has a recessed portion 74, and cam 73 has a recessed portion 75. The recessed portions 74 and 75 are absolutely identical.

Cam 57 is engaged by a pair of follower rollers 62 and 63 which are respectively mounted on levers 58 and 60 which are supported on shafts 59 and 61 for angular movement, and carry bars 53 and 54, respectively. A spring 58 connects the upper arms of levers 58, 60 and urges rollers 62, 63 onto the peripheral cam track of cam 57.

The periphery of cam 73 is engaged by a pair of cam follower rollers 67 and 71 carried by double-armed angular levers 65 and 69 which also carry bars 55 and 56, respectively. Springs 68 and 72 are connected to levers 65 and 69 and urge the same to turn to a position in which the cam follower rollers 67 and 71 abut the periphery of cam 73.

Each of the recessed cam portions 74 and 75 comprises three portions, namely the falling leading portions 74m, 75m, an intermediate rest portion 74n, 75n, and a trailing rising portion 74r, 75r. The leading portion 74m has the same peripheral length and extends over the same angle as the trailing portion 75r, the intermediate rest portions 74n and 75n are identical, and the trailing portion 74n has the same peripheral length and extends over the same angle as the leading portion 75m.

The angular relationship between the positions of main shaft 18, and cams 57 and 75 is selected so that when main shaft 18 has moved an angle of 90 degrees from its initial position and is in the position shown in FIG. 1 engaging portion 15a of press member 11a, follower roller 62 of cam lever 58 is located at the center of the trailing rising cam portion 74r, and follower roller 67 of cam lever 65 is located at the center of the leading falling cam portion 75m, as best seen in FIG. 4. In the same fashion, when main shaft 16 has turned 270 degrees out of its initial position in clockwise direction, as indicated in FIG. 1, and engages portion 15b of press member 11b, follower roller 63 of cam lever 60 is located at the center of trailing cam portion 74r of cam 57, and follower roller 71 is located at the center of the leading cam portion 75m of cam 73.

First and second control bars 77 and 76 cooperate, respectively, with the first feeler levers 47a, 47b, and the second feeler levers 49a, 49b. Control bars 77, 76 are movable in vertical direction and are controlled by a rotary cam means and cam follower means in the usual conventional manner similar to the operation of cam lever 58 and bar 53 by cam 57, for example. When control bars 77 and 76 move parallel to each other in upward direction, all feeler levers are turned in counterclockwise direction at a small angle, and all feeler needles 45a, 45b, 46a, 46b are raised out of openings 44 in the card or program tape 41, and holes 43 in drum 42 so that the program tape can be shifted to the next following position. The cam means operating control bars 77 and 76 rotate in synchronism with main shaft 18, and control bars 77, 76 are raised to retract the feeler needles when main shaft 18 has turned an angle of 180 degrees.

The diagram of FIG. 6 has a horizontal scale indicating the degrees of turning movement of main shaft 18, and from the graph illustrating the positions of control bars 76, 77 it is apparent that the same are raised between the angles of 150 and 210 degrees, and are in the highest position when the main shaft turns between the angles of 160 degrees and 200 degrees. During this period, the feeler needles are retracted, and program tape 41 is shifted, as also shown by a graph in FIG. 6.

Figure 3:
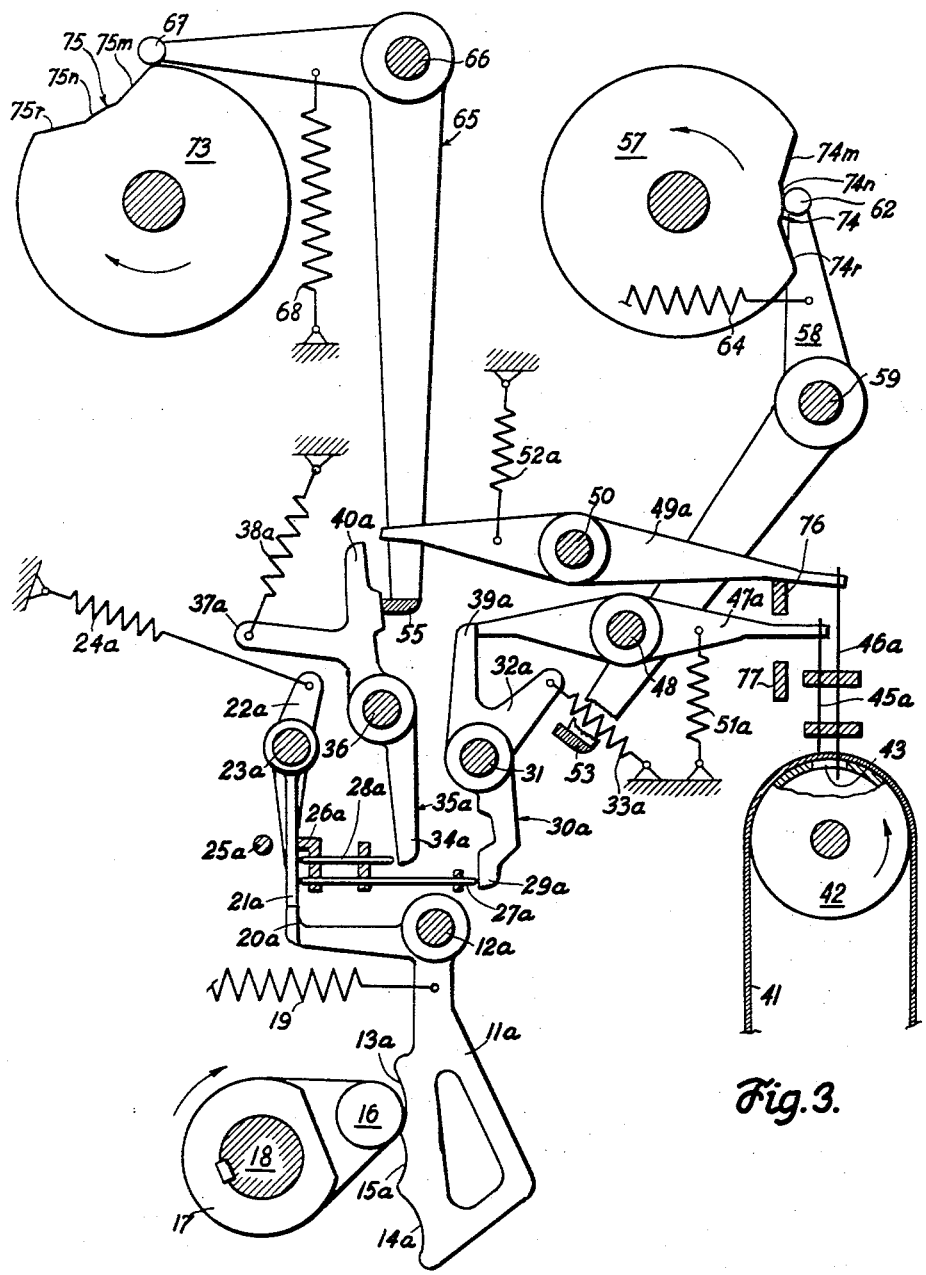
FIG. 3 is a fragmentary side elevation, partially in section, illustrating the right half of the control system of the embodiment of FIG. 1 in a position in which the old weft thread is entered, and in the moment directly preceding the change from the old to the new weft thread during the movement of the main shaft of the dobby machine in the working direction.

From the above description, it will become apparent that the control system of the invention consists of two halves for respectively controlling drawhooks 8a and 8b, and that the subscripts a and b have been used for indicating elements of the two halves, respectively. FIGS. 3, 4 and 5 show only one half of the control system, namely the parts controlling drawhook 8a, in three operational positions, and it will be understood that the parts associated with drawhook 8b will move through corresponding operational positions.

The illustrated control system corresponds to the part of the impulse mechanism of a double-action dobby machine operating on the Hattersley principle. This control system is required for controlling the shaft of a loom in both directions of rotation. In the event that the loom has a plurality of shafts, for example 16, 20, 25, corresponding numbers of control parts have to be provided in the control system, such as feeler levers, trip members, blocking members, and press members, whereas control bars 53, 54, 55, 56, 76, 77, shafts 12a, 12b, 23a, 23b, 31, 36, 48, 50, 59, 61, 66, 70, cams 57 and 73, main shaft 18, pressure roller 16, cam levers 58, 60, 65, 69, stops 25a, 25b, 26a, 26b, driving knives 79a and 79b, and drum 42 with the program tape or verdol card 41 are common to all control parts, and cooperate with rows of the same.

FIG. 1 illustrates the position of the parts of the control system after turning of main shaft 18 to an angle of 90 degrees in the clockwise direction of the arrow S. Driving knife 79a is in the lower position, and driving knife 79b is in the higher position, as diagrammatically indicated in the FIG. 6 which also shows press member 11a in a displaced position. In the position of FIG. 1, none of the feeler needles projects into a perforation of the program tape so that the loom shaft which is controlled by the push rod 1, which constitutes the output means of the system, is at rest during the time of one revolution of main shaft 18, which corresponds to two revolutions of the crankshaft of the loom.

It should be noted that, since the program tape 41 moves in the direction of the arrow, feeler needles 46a, 46b lead and respond to a new impulse provided by a perforation in rows A or B of program tape 41, while feeler needles 45a and 45b trail and sense perforations 44 in rows A and B representing preceding impulses. Row A of perforations 44 controls the half of the control system illustrated in FIGS. 3 to 5, and the coupling of the corresponding drawhook 8a with the driving knife 79a.

In the operational position of the control system illustrated in FIG. 1, in which the feeler needles 46a and 45a do not sense any perforations in the program tape, the corresponding feeler levers 47a, 49a hold trip levers 30a and 35a in the illustrated position against turning movement under the action of springs 33a and 38a. Control bars 53 and 55 are held by cams 57 and 73 in corresponding positions. Since operation of press member 11b and drawhook 8b is not desired at this phase of the operation, cams 57 and 73 hold control bars 54 and 56 which cooperative with trip levers 30b and 37b, in such a position that the upper arms 39b and 40b of trip levers 30b and 35b are spaced from the ends of feeler levers 47b and 49b.

Operation

When main shaft 18 starts to turn out of the position zero degrees indicated in FIG. 1, driving knife 79a starts its downward movement, while driving knife 79b starts its upward movement. When main shaft 18 has turned an angle of 40 degrees, driving knife 79a arrives in its lower position shown in FIG. 1, and driving knife 79b arrives in its upper position. As diagrammatically shown in FIG. 6, the driving knives remain in this position until the main shaft has turned 140 degrees, and then start the return strokes in the respective opposite directions.

When main shaft 18 has turned 55 degrees, press roller 16 engages the leading engaging portion 13a of press member 11a, and if press member 11a was angularly displaced, it is restored to the position shown in FIG. 1 when main shaft 18 has turned an angle of 90 degrees and press roller 16 engages the central portion 15a.

In the following, only the control and operation of press member 11a will be described with particular reference to FIGS. 3 to 5 illustrating the corresponding half of the control system, and it will be understood that the control and operation of the press member 11b is carried out in the same manner, but takes place after a phase lag of 180 degrees as is conventional for double-action dobby machines.

The motions of the control system taking place while main shaft 18 turns out of the zero degree position an angle of substantially 70 degrees to the position of FIG. 3, will be described hereinafter. Irrespective of the preceding angular position of press member 11a, the same is turned in counterclockwise direction to a position in which its projecting abutment 20a is located below blocking portion 21a of blocking member 22a, permitting spring 24a to turn blocking member to the position of FIG. 3 registering with abutment 20a, assuming that blocking member 22a was displaced as shown in FIG. 5.

The return of blocking member 22a to the blocking position of FIG. 3, is also made possible by the angular displacement of trip lever 35a by control bar 55 during movement of cam follower roller 67 along the circular peripheral cam track portion of cam 73.

The other motion transmitting needle 27a does not obstruct the movement of blocking member 22a to the position aligned with the abutment 20a, since feeler lever 47a holds trip lever 30a against the action of spring 33a, due to the fact that feeler needle 45a does not engage a perforation in the program tape or verdol card 41. Cam follower roller 62 engages the intermediate cam portion 74n, so that control bar 53 is retracted from arm 32a of trip lever 30a. Since feeler needle 46a engages a perforation 44 in row A of the program tape, spring 52a has turned feeler lever 49a in clockwise direction so that feeler lever 49a is spaced from portion 40a of trip lever 35a which is held by control bar 55 against the action of spring 38a since cam follower roller 67 is located on the circular peripheral track portion of cam 73. Due to the fact that feeler lever 49a is located out of the path of movement of portion 40a, trip lever 35a can be turned by spring 38a, if released by control bar 55. Movement of feeler needle 46a is limited due to the abutment of feeler lever 49a on the upper control bar 76, control bars 76 and 77 being in the lower position in which they remain until main shaft 18 has turned an angle of substantially 145 degrees. In the position of FIG. 3 of the impulse control system, the preceding weft thread was entered which is now sensed by feeler needle 45a.

Main shaft 18 continues to turn, and arrives in the 90 degree position shown in FIG. 4, which is different from the position of FIG. 1 inasmuch as feeler needle 46a engages a perforation 44 of the program tape 41, so that feeler lever 49a releases trip lever 35a. During the movement of the parts of the system from the position of FIG. 3 to the position of FIG. 4, press roller 16 has engaged the central engaging portion 15a of press member 11a, and cam follower roller 67 has moved from the circular peripheral cam track portion of cam 73 to the falling leading cam portion 75m, while cam follower roller 62 has moved from the intermediate cam portion 74n of cam 57 to the trailing rising cam portion 74r.

Spring 68 causes a counterclockwise movement of cam lever 65 so that control bar 55 is displaced, permitting portion 34a of trip lever 35a to engage the end of motion transmitting needle 28a under the action of spring 38a. At the same time, cam portion 74r turns cam lever 58 in clockwise direction so that control bar 53 abuts arm 32a of trip lever 30a, from which it was spaced in the position of FIG. 3.

In the 90 degree position of main shaft 18, the control device is neither set to the preceding weft thread, nor set to the new weft thread, and the direction of rotation of main shaft 18 determines which weft thread will be entered, and which impulse will be stored in the impulse control system. In the event that shaft 18 continues its rotation in the clockwise working direction, the control system assumes the position of FIG. 5 in which the impulse representing the previous weft thread is cancelled, and the impulse representing the new weft thread is given.

In the position of FIG. 5, press roller 16 engages the trailing engaging portion 14a having turned an angle of 110 degrees. Cam follower roller 67 has arrived at the intermediate cam portion 75n so that spring 68 has turned cam lever 65 in counterclockwise direction whereby control bar 55 moves to the right as viewed in FIG. 5, permitting spring 38a to turn trip lever 35a in clockwise direction so that portion 34a shifts motion transmitting needle 28a to the left and turns blocking member 22a in clockwise direction until the same abuts stop 25a.

Since abutment 20a is no longer blocked by blocking portion 21a, spring 19 turns member 11a as far as permitted by the position of press roller 16. As a result, abutment 20a is located laterally of blocking portion 21a. Spring 38a is stronger than spring 24a which resists the angular displacement of blocking member 22a by trip lever 35a.

At the same time, cam 57 has continued its turning movement, and cam follower roller 62 is now located on the circular peripheral track portion of cam 57 so that cam lever 58 is further turned in clockwise direction and control bar 53 moves to the left and turns trip lever 30a in counterclockwise direction to a position in which its portion 29a is spaced from the end of the motion transmitting needle 27a, and portion 39a is spaced from the end of feeler lever 47a.

In this position, the impulse representing the preceding weft thread which in the clockwise working direction of main shaft 18 was sensed by feeler needle 45a and feeler lever 47a, is cancelled, and the necessary impulse of the new weft thread is given which is sensed by feeler needle 46a and feeler lever 49a since feeler needle 46a engages a perforation 44 of the program tape.

If feeler needle 46a would not have sensed a perforation in the program tape, trip lever 35a could not have turned under the action of spring 38a to displace blocking member 22a to release member 11a, since trip lever 35a would have been blocked by feeler lever 49a engaging portion 40a in the position of FIG. 1 showing feeler needle 46a sensing no perforation 44.

Since member 11a is permitted by the displacement of stop member 22a to move toward shaft 18, drawhook 8a is pulled in the same direction by spring 9, and hook 78a engages the driving knife 79a to be moved by the same to an upper position during the later upward movement of driving knife 79a.

The further operations will now be described with reference to FIGS. 1 and 6.

From the position shown in FIG. 5, main shaft 18 with pressure roller 16 turns further in clockwise direction with cams 57 and 73, and in the 120 degree position, cam follower roller 67 begins to move from the trailing cam portion 75n and to move onto the rising trailing portion 75r, resulting in a turning movement of cam lever 65 about shaft 66 in clockwise direction so that control bar 55 exerts pressure on arm 40a of trip lever 35a and turns the same against the action of springs 38a in counterclockwise direction so that arm 34a moves away from motion transmitting needle 28a permitting spring 24a to turn blocking member 22a in counterclockwise direction until blocking portion 21a is stopped by abutment 20a of member 11a which is still in the position of FIG. 5.

In this manner, the impulse representing the new weft thread is cancelled in the impulse control system, but is still represented by the position of member 11a until pressure roller 16 again engages the leading engaging portion 13a of member 11a. In view of the fact that cam follower roller 62 moves along the circular peripheral cam track portion of cam 57, control bar 53 does not change its position, and trip member 30a remains in the position in which portion 29a is spaced from the end of motion transmitting needle 27a. The cancellation of the impulse representing the new weft thread is completed when the main shaft 18 arrives in the 145 degree position, as will be understood from FIG. 6 which shows that at this angle, control bar 55 restores trip lever 35a to its initial position.

As noted above in the description of FIG. 5, drawhook 8a is placed in a position in which its hook 78a is located in the path of movement of driving knife 79a. When main shaft 18 arrives in its 140 degree position, driving knife 79a starts its upward movement, and since it is coupled to the respective drawhook 8a, the same is raised and acts through the linkage 2 to 6 on the output rod 1 to displace the loom shaft. At the same time, driving knife 79b starts its return movement in downward direction.

Also in the 140 degree position of main shaft 18, the control bars 76 and 77 start to move from the lower position shown in FIGS. 1 to 5 to an upper position in which they arrive in the 160 degree position of the main shaft. The raised control bars 76 and 77 lift the right arms of feeler levers 47a, 47b, 49a, 49b simultaneously so that all feeler needles 45a, 46b, 46a, 46b are retracted from the opening of the program tape or verdol card 41, irrespective of the previous positions of the feeler needles. Since in this position of the main shaft, trip lever 35a has already been turned in counterclockwise direction, portion 40a of trip lever 35a does not obstruct the turning movement of feeler lever 49a to the position shown in FIG. 1.

When the main shaft 18 arrives substantially in the 160 degree position, a program tape 41 is advanced on drum 42 a step whose length corresponds to the distance between two adjacent openings 44 of the same row, and the shifting of the program tape 41 is terminated when the main shaft arrives in the 200 degree position. The control bars 76 and 77 start their downward movement, as shown in FIG. 6 so that springs 51a, 51b, 52a, 52b transmit through the feeler levers a force to the feeler needles pressing the same against the program tape so that any feeler needle which is locatd opposite the perforation 44, enters into the same. This results in a turning of the respective feeler lever in clockwise direction about shafts 48, 50 and in the release of the respective trip levers by the displaced feeler levers.

Feeler levers 47a, 47b, 49a, 49b have assumed the positions determined by the program tape when main shaft 18 arrives in the 215 degree position in which pressure roller 16 begins to engage the leading portion 14b of member 11b so that member 11b is turned about shaft 12b in clockwise direction until its abutment 20b is located under the blocking portion 21b of blocking member 22b when main shaft 18 arrives in the 250 degree position. The further operations under the control of pressure roller 16 in the shaft positions between 215 degrees and 320 degrees will not be described in detail, since the function of the control parts of the left half of the control system is the same as described with reference to the right half, and takes place at a phase lag of 180 degrees. However, it will be noted that in the 220 degree position of the main shaft 18, the driving knife 79a has terminated its upward movement, and the driving knife 79b has terminated its downward movement.

When main shaft 18 is in the 360 degree position, the driving knives 79a and 79b pass each other during movement in opposite directions similarly as described for the 180 degree position of the main shaft. However, the feeler levers 47a, 47b, 49a, 49b are not raised, and the program tape 41 is not advanced. The movements of the driving knives are terminated in the new 40 degree position of the main shaft.

An important phase of the operation, which has not yet been described, is the operation of the control system during the angular movement of main shaft 18 from the 40 degree position to the 80 degree position. Approximately in the 40 degree position, the cam follower roller 62 of cam lever 58 moves from the circular peripheral cam track portion of cam 57 onto the leading falling cam portion 74m, which causes the storing of a control impulse for the previous weft thread since cam lever 58 turns in counterclockwise direction so that its control bar 53 moves away from arm 32a of trip lever 30a so that spring 33a turns trip lever 30a in clockwise direction until its engaging portion 39a is either stopped by the left arm of feeler lever 47a, substantially in the position of FIG. 1, or moves under the left arm of feeler lever 47a, substantially corresponding to the positions of trip lever 35a and feeler lever 49a in FIG. 5. This depends on the position of feeler needle 45a of feeler lever 47a. If feeler needle 45a enters a perforation of the program tape, feeler lever 47a moves out of the path of movement of portion 39a of trip lever 30a, but when no perforation is sensed, feeler lever 47a remains in a position blocking turning movement of trip lever 30a, as shown in FIG. 3.

If a perforation is sensed by feeler needle 45a, trip lever 30a is turned by a spring 33a and its arm 29a engages the end of motion transmitting needle 27a to shift the same to the left for displacing stop member 22a so that the impulse representing the previous weft thread is stored, and remains stored until main shaft 18 arrives in the 70 degree position in which the operations described with reference to FIG. 3 commence.

It must be emphasized that in the event that main shaft 18 is turned opposite to the direction indicated by the arrow S in which the above-described operations successively take place, all rotary parts of the control system also reverse their direction of rotation for carrying out all the above-described operations, the only difference being that the direction of rotation is reversed.

The diagram of FIG. 6 remains completely valid, if interpreted in the direction from 360 degrees to zero degrees instead of from zero degrees to 360 degrees, as described above.

For example, in the event that the dobby machine is stopped in the 90 degree position of main shaft 18, and the direction of rotation is reversed so that main shaft 18 rotates in counterclockwise direction in the position of the control system illustrated in FIG. 4, an impulse representing the previous weft thread is stored, and the impulse representing the new weft thread is cancelled, while the control system assumes the position shown in FIG. 3.

The 90 degree position of main shaft 18 shown in FIG. 4 can be considered as a position in which the impulse representing the previous weft thread is partly cancelled, and an impulse representing the new weft thread is partly stored. During the further turning movement of main shaft 18 out of this position, the impulse representing the previous weft thread is more and more cleared, and the impulse representing the new weft thread is more and more stored, or if the direction of rotation is reversed, the impulse representing the previous weft thread is fully stored, and the impulse representing the new weft thread is cancelled.

From the above description of a preferred embodiment of the invention, it will become apparent that driving knives 79a, 79b constitute reciprocating drive means, and that members 8a, 8b, 78a, 78b are coupling means which, when operated by the actuating press members 11a, 11b couple the drive means 79a, 79b with the output means 1 to 6. Blocking means 22a and 22b are movable between a blocking position shown in FIG. 3, and a releasing position shown in FIG. 5. Trip members 30a, 30b and 35a, 35b have a tensioned normal position and are biassed to assume an actuated position for moving blocking means 22a, 22b to the releasing position. Control bars 53, 54, 55, 56 are operated by cam means 57, 73 to restore trip members 30a, 35a to normal tensioned positions. Feeler levers 49a, 49b, 47a, 47b and the associated feeler needles 45a, 45b, 46a, 46b constitute first and second sensing means controlling the first and second trip members 30a and 35a, or the trip levers 30b, 35b, respectively.

The control system has two identical halves for respectively controlling the drawhooks 8a and 8b by actuating press members 11a and 11b. For example, the half of the control system shown in FIGS. 3 to 5 includes one blocking means, 22a, and first and second operating means including first and second trip levers 30a and 35a, and first and second sensing means 47a, 45a and 49a, 46a. The first and second cams 57, 73 with cam levers 58, 65 and control bars 53, 55 constitute a rotary control means for controlling the trip levers of the first and second operating means to move blocking means 22a between the blocking and releasing positions. The first and second sensing means cooperate with movable program means, shown to be a perforated program tape or verdol card, in such a manner that the first and second sensing means sense simultaneously two successive recordings 44 in one row A of the program tape 41 representing two successive weft threads.

The first sensing means 45a, 47a, which senses the leading recording of the two sensed recordings, causes movement of the first trip lever 30a of the first operating means to a position representing a first weft thread, and the second sensing means 46a, 49a causes movement of the second trip lever 35a of the second operating means to a position representing a second weft thread. However, upon movement of the program tape 41 one step to the next following position, the first sensing means senses the second recording and causes movement of the first operating means to a position representing the second weft thread, while the second sensing means senses a third successive recording representing a new weft thread so that the second operating means moves to a position representing the new weft thread.

The rotary main shaft 18 has an eccentric means 16 and revolves in synchronism with the control means 57 for controlling the actuating means 11a to permit movement of the same in a predetermined cycle to the operative position in which the coupling means 78a are engaged with drive means 79a. Such movement of the actuating press member 11a is only possible if blocking means 22a is in the releasing position shown in FIG. 5.

It will be understood that each of the elements described above, or two or more together, may also find a useful application in other types of control systems for dobby machines differing from the types described above.

While the invention has been illustrated and described as embodied in a reversible control system for a dobby machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Control system for a dobby machine, comprising, in combination, output means; reciprocating drive means; coupling means having a coupling position for coupling said output means with said drive means; actuating means for said coupling means having an inoperative position, and an operative position for causing movement of said coupling means to said coupling position, and including biasing means for urging said actuating means to said operative position; blocking means having a blocking position for blocking movement of said actuating means to said operative position, and a releasing position releasing said actuating means for movement to said operative position, said blocking means being biased to assume said blocking position; first and second operating means for moving said blocking means independently of each other to said releasing position, and including first and second sensing means; movable program means having a series of recordings representing weft insertions, said first and second sensing means sensing simultaneously two successive recordings of said program means representing two successive weft insertions so that said first sensing means sensing the leading recording of said two recordings controls movement of said first operating means to a position representing a first weft insertion, and said second sensing means sensing the second trailing recording controls movement of said second operating means to a position representing a second weft insertion while upon movement of said program means, said first sensing means senses said second recording and controls movement of said first operating means to a position representing said second weft insertion while said second sensing means senses a third successive recording representing a third weft insertion and said second operating means moves to a position representing the third weft insertion; rotary control means for controlling said first and second operating means to move said blocking means between said blocking and releasing positions in accordance with the program information programmed into said first and second operating means in said weft insertion representing positions; and a rotary main shaft having an eccentric means revolving therewith in synchronism with said control means and controlling said actuating means to permit movement of the same in a predetermined cycle to said operative position if said blocking means is in said releasing position whereby upon a reversal of the direction of rotation of said control means and main shaft, the operations of said operating means take place in a reversed sequence.

2. A control system according to claim 1 wherein said first and second operating means respectively include first and second spring-loaded trip members; wherein said first and second sensing means respectively include first and second feeler levers, and first and second feeler needles secured to said first and second levers, respectively; wherein said program means include a stepwise movable program tape having a row of perforations arranged in accordance with a program; wherein said feeler needles sense two consecutive positions of said row and are adapted to move into said perforations; and wherein said first and second feeler levers block movement of said first and second trip members when the respective first and second feeler needles sense no perforation, and permit movement of said first and second trip members when the respective feeler needle senses a perforation and moves into the same.

3. A control system according to claim 2 wherein said blocking means is a spring-loaded blocking member; and including first and second motion transmitting needles having ends respectively engaging said first and second trip members and said blocking member so that said blocking member is moved to said releasing position when either trip member is released by the respective feeler lever under the control of said rotary control means.

4. A control system according to claim 2 wherein said rotary control means includes first and second rotary cams, and first and second cam followers respectively cooperating with said first and second cams and including first and second bars cooperating with said trip members; wherein said blocking means includes a turnable blocking member and a blocking spring urging said blocking member to said blocking position; wherein said first and second operating means include first and second trip springs respectively connected with said first and second trip members for urging the same to turn until blocked by said first and second feeler levers or by said first and second bars, and first and second motion transmitting needles having ends respectively cooperating with said first and second trip members and with said blocking member.

5. A control system according to claim 4 wherein said actuating means includes a press member, and a spring urging said press member to abut said blocking member or said eccentric means of said rotary main shaft when said eccentric means passes said press member, and wherein said blocking member in said releasing position permits said press member to allow said coupling means to move into said coupling position.

6. A control system according to claim 5 wherein said drive means includes a reciprocating knife of a dobby machine; and wherein said coupling means include a drawhook having an inoperative position located outside of the path of reciprocation of said knife, and a coupling position located in the path of reciprocation of said knife so as to be engaged by and coupled to said knife.

7. A control system according to claim 6 wherein said eccentric means is a roller mounted on said main shaft spaced from the axis of the same; and wherein said press member has three adjacent engaging portions successively engaged by said eccentric roller during each revolution of said main shaft, said press member holding said drawhook in said inoperative position when said roller engages the central engaging portion thereof.

8. A control system according to claim 1 wherein said rotary control means include first and second rotary cams, and first and second cam follower means cooperating with said rotary cams and being operatively connected with said first and second operating means for controlling the movement of the same.

9. A control system according to claim 8 wherein said first and second operating means include first and second springs biassing said first and second operating means to move said blocking means to said releasing position, respectively; wherein said first and second sensing means block or release said first and second operating means in accordance with information sensed on said program means; and wherein said first and second cam follower means block or release said first and second operating means in accordance with the shape of the cam tracks of said first and second cams.

10. A control system according to claim 9 wherein each of said first and second cams has a circular cam track interrupted by a recess, each recess including a leading falling cam portion, an intermediate low cam portion, and a trailing rising cam portion.

11. A control system according to claim 1 wherein said drive means include a pair of drive members reciprocating in opposite directions; wherein said coupling means include a pair of drawhooks having a coupling position respectively engaging said drive members, and spring means urging said drawhooks to said coupling position; wherein said actuating means include a pair of press levers, and spring means urging said press levers to move to operative positions for moving said drawhooks to said coupling positions, each of said press levers having an abutment; wherein said blocking means includes a pair of turnable blocking levers, and a pair of springs urging said blocking levers to blocking positions to prevent turning movement of said press levers, said blocking levers having a blocking position located in the path of movement of said abutment of said pair of press levers; wherein said first and second operating means each include a pair of motion transmitting needles respectively abutting said blocking levers, and a pair of first and second trip levers and a pair of first and second trip springs respectively loading said trip levers to urge said pairs of first and second motion transmitting needles against said blocking levers of said pair, respectively, wherein said sensing means include a pair of first and second feeler levers for respectively blocking movement of said pair of first and second trip levers, and a pair of first and second feeler needles respectively cooperating with two rows of recordings of said program means; and wherein said rotary control means include first and second rotary cams, and a pair of first and second cam follower means, a pair of first cam follower means being controlled by said first cam and a pair of second cam follower means being controlled by said second cam, said pairs of first and second cam follower means respectively controlling said pairs of first and second trip levers.

12. A control system according to claim 11 wherein said eccentric means is a roller eccentrically carried by said main shaft and successively engaging said press levers of said pair during each revolution of said main shaft so that said drawhooks are alternately coupled with said drive members.

13. A control system according to claim 12 wherein each of said press levers has three adjacent engaging portions successively engaged by said eccentric roller during rotation of said main shaft, said eccentric roller, when engaging the center engaging portion of one of said press levers, holding the respective press lever in an inoperative position in which the respective drawhook is not coupled with the respective drive member.

14. A control system according to claim 12 wherein each of said cams has a circular cam track interrupted by a recess, the recess of each cam having a portion which causes the respective cam follower means engaging the same to move to a position permitting movement of the respective trip lever for moving the respective blocking lever to said releasing position permitting turning of the respective press lever to said operative position unless blocked by said eccentric roller of said main shaft.

References Cited

UNITED STATES PATENTS 2,751,938   6/1956   Staubli et al. _____ 139—68

FOREIGN PATENTS 1,272,482   8/1961   France.
1,348,879   12/1963   France.

HENRY S. JAUDON, *Primary Examiner.*